United States Patent [19]

Hirsch

[11] Patent Number: 5,261,007
[45] Date of Patent: * Nov. 9, 1993

[54] FREQUENCY DIVISION, ENERGY COMPARISON SIGNAL PROCESSING SYSTEM

[75] Inventor: Peter Hirsch, Denville, N.J.

[73] Assignee: Visidyne, Inc., Burlington, Mass.

[*] Notice: The portion of the term of this patent subsequent to Jun. 2, 2009 has been disclaimed.

[21] Appl. No.: 712,973

[22] Filed: Jun. 10, 1991

Related U.S. Application Data

[63] Continuation-in-part of Ser. No. 611,935, Nov. 9, 1990, Pat. No. 5,119,432.

[51] Int. Cl.$^5$ ............................ G06K 9/00; G10L 5/00
[52] U.S. Cl. ............................................. 382/1; 73/648; 364/484; 381/45; 382/17; 382/29
[58] Field of Search ................. 382/1, 17, 29; 73/648; 364/484; 381/45, 49, 50; 367/32, 43, 49

[56] References Cited

U.S. PATENT DOCUMENTS 4,383,135  5/1983  Scott et al. .......................... 381/45
5,119,432  6/1992  Hitsch .................................. 382/1

Primary Examiner—Leo H. Boudreau
Attorney, Agent, or Firm—Iandiorio & Dingman

[57] ABSTRACT

A frequency division, energy comparison signal processing system for detecting the presence of, and separating the contributions from, sources that compose a wide-band sound signal, in which the system divides at least part of the wide-band sound signal into a number of discrete narrow frequency band components, generates the energy envelope of each of those components, normalizes the envelopes, multiplies each normalized envelope with each of the other normalized envelopes to obtain a plurality of envelope correlation coefficients for each frequency band, and then identifies from the correlation coefficients a sound source seed frequency band component and then, using the seed, identifies the remaining frequency components of a sound source.

26 Claims, 9 Drawing Sheets

FREQUENCY DIVISION, ENERGY COMPARISON SIGNAL PROCESSING SYSTEM

CROSS REFERENCE TO RELATED APPLICATION

This application is a continuation in part of copending application Ser. No. 07/611,935, filed Nov. 9, 1990, now U.S. Pat. No. 5,119,432.

FIELD OF INVENTION

This invention relates to a frequency division, energy comparison signal processing system to detect the presence of, and separate the contributions from, multiple sources that compose a wide band signal.

BACKGROUND OF INVENTION

There are numerous situations in which it would be desirable to detect the presence of, and separate the contributions from, multiple sources that compose a wide band signal. For example, it is desirable to detect, localize and classify long range contacts or sources of sound in passive surveillance of the sub-surface ocean. Currently, such information is discerned using two or more physically spaced, directional, multi-channel receivers. Each receiver scans in azimuth across the surveillance area at a single frequency, and plots the power of the received signal; the receiver steps through a number of discrete frequencies in this manner to obtain a directional frequency spectrum. Localization is accomplished by cross-fixing a source detected by the two receivers. The spectrum of each single, localized contact is then compared to a library of the spectral signatures of known contacts for classification. In this case, the spatial information is necessary to permit the separation of the contributors to the wide band signal.

Although such systems are able to detect, localize and classify contacts, they have a number of drawbacks which make them less than ideal solutions to the problem. For one, these systems require two receivers to separate the contributors on the basis of their separate locations. Further, since any single detected source is not necessarily unique to a contact, classification is typically based on a number of detected sources. Therefore, it is necessary to first determine that the multiple sources belong to a single contact. Accordingly, unambiguous classification typically requires that the system first localize the sources by cross-fixing using two directional receivers. Alternatively, a single contributor may be discerned by comparing a multitude of detected sources to a previously-established library of the unique sources associated with known contributors. However, this requires that the emission spectrum of the contributor has been previously mapped and that the sources be loud enough to be clearly dominant. Classification may then be based on the source signals emanating from that single contributor. Accordingly, the detection and classification of contacts requires either equipment redundancy or loud signals plus a library of known contacts. In addition, the multiple-receiver technique is relatively expensive because directionality requires physically large receivers.

There are other situations in which it would be desirable to detect the presence of, and separate the contributions from, multiple sources that compose a wide band signal. For example, in X-ray and radio astronomy it is desirable to detect and classify X-ray and radio sources. However, due to the distances involved it is impossible to determine the range to a source by cross-fixing. Accordingly, to date it has not been possible to unambiguously separate astronomical X-ray and radio sources within a wide-band x-ray and radio source, when they all lie in the same direction in space. It would also be desirable to determine information from EKGs and from brain waves captured by electroencephalograph. To date, however, it has not been possible to use an EEG to predict the onset of an unusual brain event.

SUMMARY OF INVENTION

It is therefore an object of this invention to provide a frequency division, energy comparison signal processing system which can detect the presence of, and separate the contributions from, multiple sources that compose a wide band signal using only a single receiver.

It is a further object of this invention to provide such a system which can detect the presence of, and separate the contributions from, multiple sources that compose a wide band signal without first localizing the source.

It is a further object of this invention to provide such a system which maps the spectrum of a signal source with a single receiver.

It is a further object of this invention to provide such a system which can associate signals with a source without prior knowledge of the source location.

It is a further object of this invention to provide such a system which can associate signals with a source without prior knowledge of the source emission spectrum.

It is a further object of this invention to provide such a system which detects ocean contacts.

It is a further object of this invention to provide such a system which can map the signature of an undersea contact without the need for localization.

It is a further object of this invention to provide such a system which detects the onset of an unusual brain event.

It is a further object of this invention to extract new diagnostic information from electrocardiograms (EKGs).

It is a further object of this invention to provide such a system which allows for unambiguous separation of multiple astronomical X-ray and radio sources, when they all lie in the same direction in space.

This invention results from the realization that the contributions from a single signal source in a wide-band signal may be quickly and easily detected by observing similarities in the signal energy envelopes of a number of discrete narrow frequency bands of the wide-band signal.

This invention features a frequency division, energy comparison signal processing system for detecting the presence of and separating the contributions from one or more sources that compose a wide-band sound signal. The system divides the signal into a number of discrete narrow band frequency components, generates the energy envelope of each of those components, normalizes the envelopes and multiplies each normalized envelope with each of the other normalized envelopes to obtain a plurality of envelope correlation coefficients for each band. The system then identifies a sound source seed frequency band as the first step in determining the frequency components of a sound source. Once the seed band is identified, a cluster of bands associated with a source sound may be identified by determining the bands that have envelopes with above-threshold correlation with the seed frequency envelope.

In one embodiment, the correlation coefficients are compared to a correlation coefficient threshold value to identify coefficients above the threshold value. The seed frequency band component may then be identified by counting the number of correlation coefficients in each frequency band above the threshold value, and determining the band having the largest number of correlation coefficients above the threshold value as the seed band.

Alternatively, the system may identify the seed band by measuring the signal power in each band and multiplying the count of the number of correlation coefficients above the threshold at each frequency by the power of the corresponding frequency to obtain a frequency band weighted power value. The seed band may then be identified by finding the band with the largest weighted power value.

Another method of identifying the seed contemplates summing the correlation coefficients in each frequency band and identifying the seed band as the band having the largest correlation coefficient sum.

Yet another embodiment multiplies the summed correlation coefficients by the band power to obtain a frequency band summed weighted power value, and identifies the seed band as the band having the largest such summed weighted power value.

In another embodiment of identifying the seed, the system determines the largest of the plurality of correlation coefficients, and identifies the two frequency bands corresponding to that correlation coefficient as the seed bands. In yet another embodiment, the system multiplies each correlation coefficient by the power in each of the two bands it represents to obtain frequency band covariance values. The seed bands are then identified as the two frequency bands corresponding to the largest covariance value.

The seed may also be identified by first finding the two frequency bands corresponding to the largest correlation coefficient, and then identifying all other bands whose envelopes correlate above some threshold with either of the two. The result is a list of frequencies, from among which the system then identifies the largest contiguous group of frequency bands in the list. The energy envelopes of these contiguous frequency bands are then summed to create the seed energy envelope.

DISCLOSURE OF PREFERRED EMBODIMENT

Other objects, features and advantages will occur to those skilled in the art from the following description of a preferred embodiment and the accompanying drawings, in which.

Figure 1:
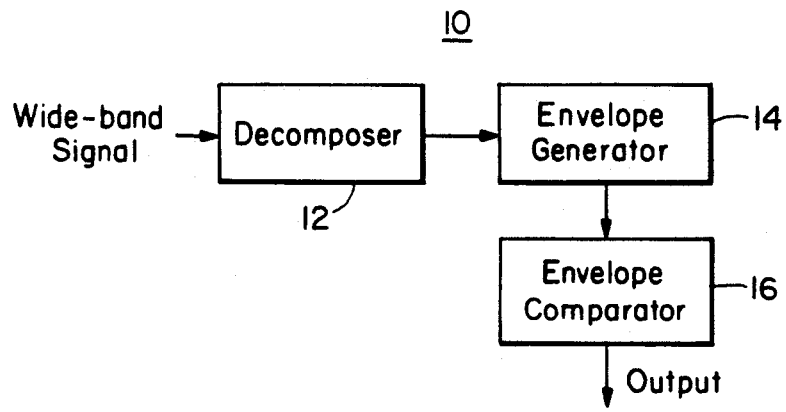
FIG. 1 is a simplified block diagram of the frequency division, energy comparison, signal processing system according to this invention.

There is shown in FIG. 1 a frequency division, energy comparison, signal processing system 10 according to this invention for detecting the presence of, and separating the contributions from, multiple sources that compose a wide band signal. System 10 includes decomposer 12 for decomposing the wide-band signal into a number of bands, which may be narrow or broad, contiguous, spaced, or overlapping. Preferably, decomposer 12 creates narrow, discrete bands in each of which a single contact or signal source dominates the band spectrum. Envelope generator 14 generates the energy envelope of each of the bands from decomposer 12. Each of those envelopes is then compared to each of the other envelopes in envelope comparator 16; the method of comparison is to calculate the correlation coefficient. Patterns in such correlation coefficients, including statistically significant groupings of similar envelopes indicative of sources contributing to the wide-band signal, may then be identified for detection of a signal source.

Figure 3A:
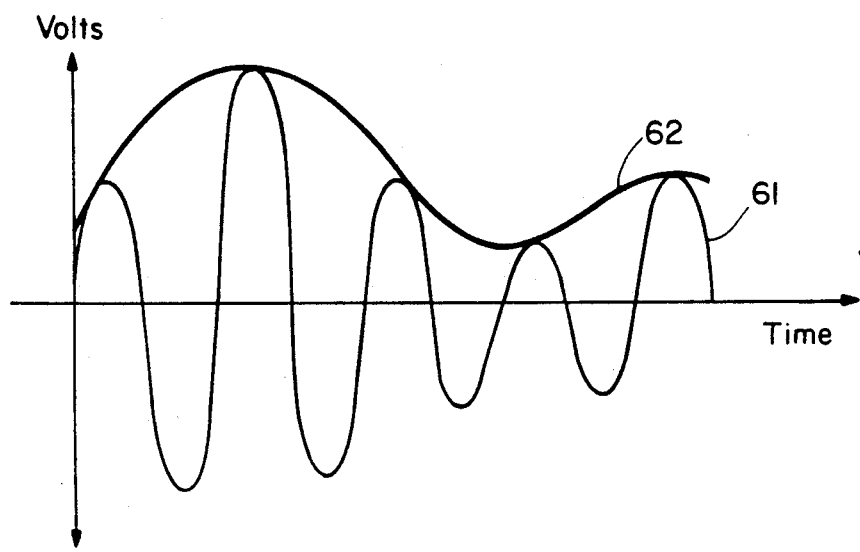
FIGS. 3A and 3B are examples of two signals from the decomposer of FIG. 2, and the energy envelopes generated from those signals by the system of FIG. 2.
Figure 3B:
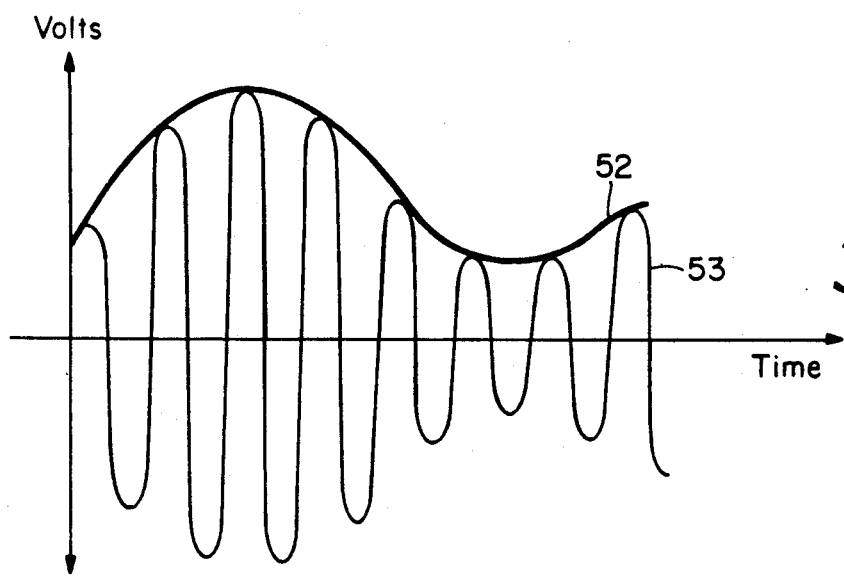
Figure 2:
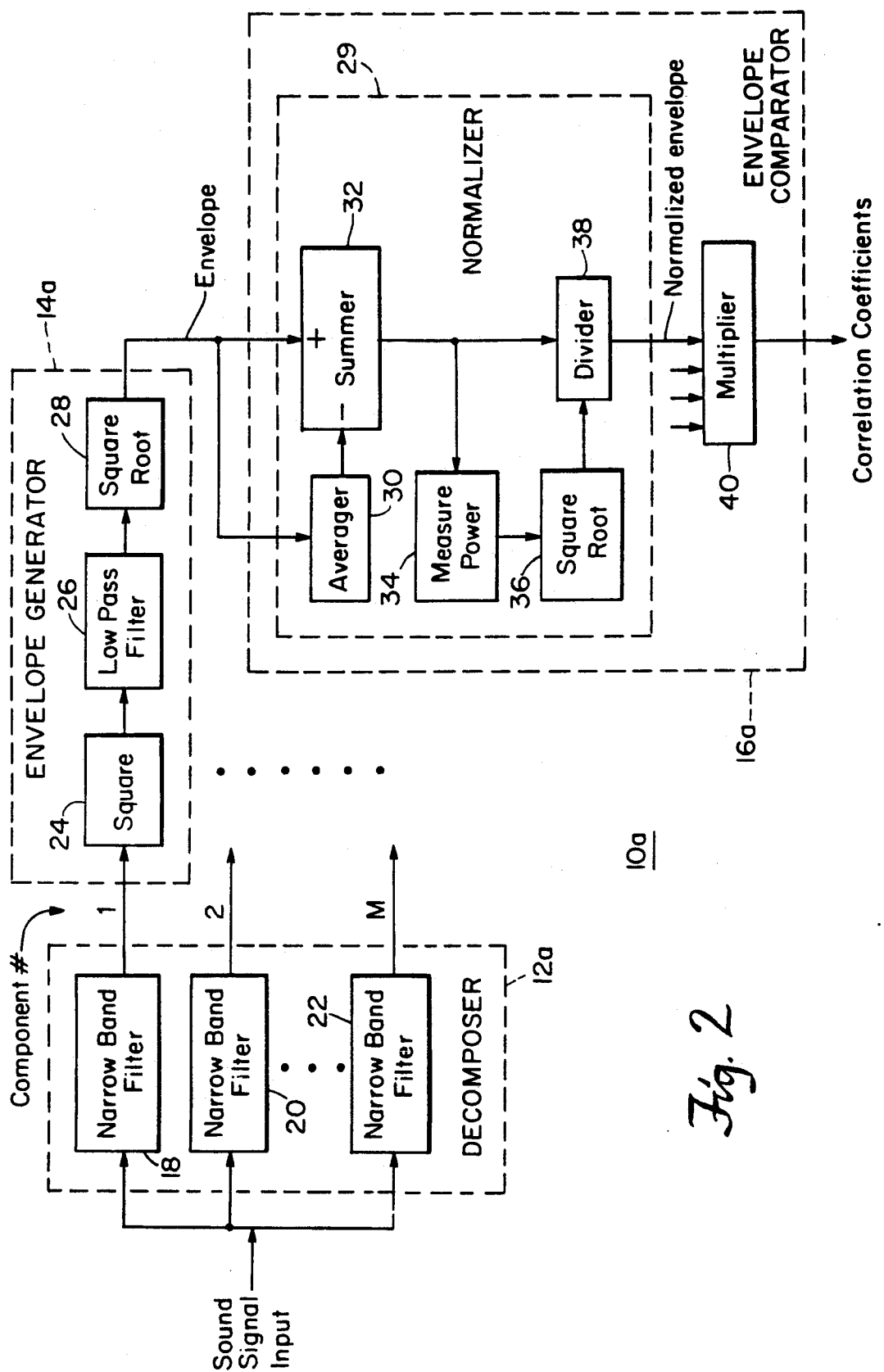
FIG. 2 is a more detailed block diagram of an embodiment of the system of FIG. 1.

A more detailed embodiment of system 10a according to this invention is shown in FIG. 2. Decomposer 12a includes a number of narrow band filters such as filters 18, 20, . . . 22 for creating signal components 1, 2, . . . M, respectively. Preferably, each narrow band filter has the same narrow bandwidth, and the bands do not overlap. It is also preferred that the center frequency of each narrow band filter is an integral multiple of the center frequency of narrow band filter 18 having the lowest center frequency. For example, filter 20 may have a center frequency twice that of filter 18, the next filter three times that center frequency, and so forth, up to the final filter 22, which would have a center frequency of M times the center frequency of filter 18. Examples of outputs of two such filters, for example filters 18 and 20, are shown in FIGS. 3A and 3B; signal 53 from filter 20 has twice the center frequency of signal 61 from filter 18, while envelope 52 resembles—is correlated with—envelope 62.

The series of filtered signals emanating from decomposer 12a enter a number of parallel envelope generators such as generator 14a, FIG. 2. In practice there would be one such envelope generator for each narrow band component 1 through M but only one is shown here for clarity. The envelopes are generated by squaring the narrow band signal in squaring circuit 24, filtering the squared signal with low pass filter 26, and taking the square root of the filtered signal with circuit 28. Envelope 62 of signal 61 and envelope 52 of signal 53 are illustrated in FIGS. 3A and 3B.

The envelope signals then enter envelope comparator 16a, which includes envelope normalizer 29 and multiplier 40. In practice, there would be a normalizer for each envelope; only one is shown for clarity. In normalizer 29, the envelope signal is averaged in circuit 30, and the average is subtracted from the envelope in summer 32. The power of the difference signal is then measured in circuit 34, and its square root taken in circuit 36. The difference signal from summer 32 is then divided by the square root of the power signal in circuit 38 to create a normalized envelope signal, which is then applied to multiplier 40. Multiplier 40 multiplies each normalized envelope by each of the other normalized envelopes from wide band signal components 1 through M to determine the correlation coefficient of each possible pair of normalized envelopes. The correlation coefficients may then be analyzed as further described below to detect the presence of, and separate the contributions from, multiple sources that compose a wide band signal.

Figure 4:
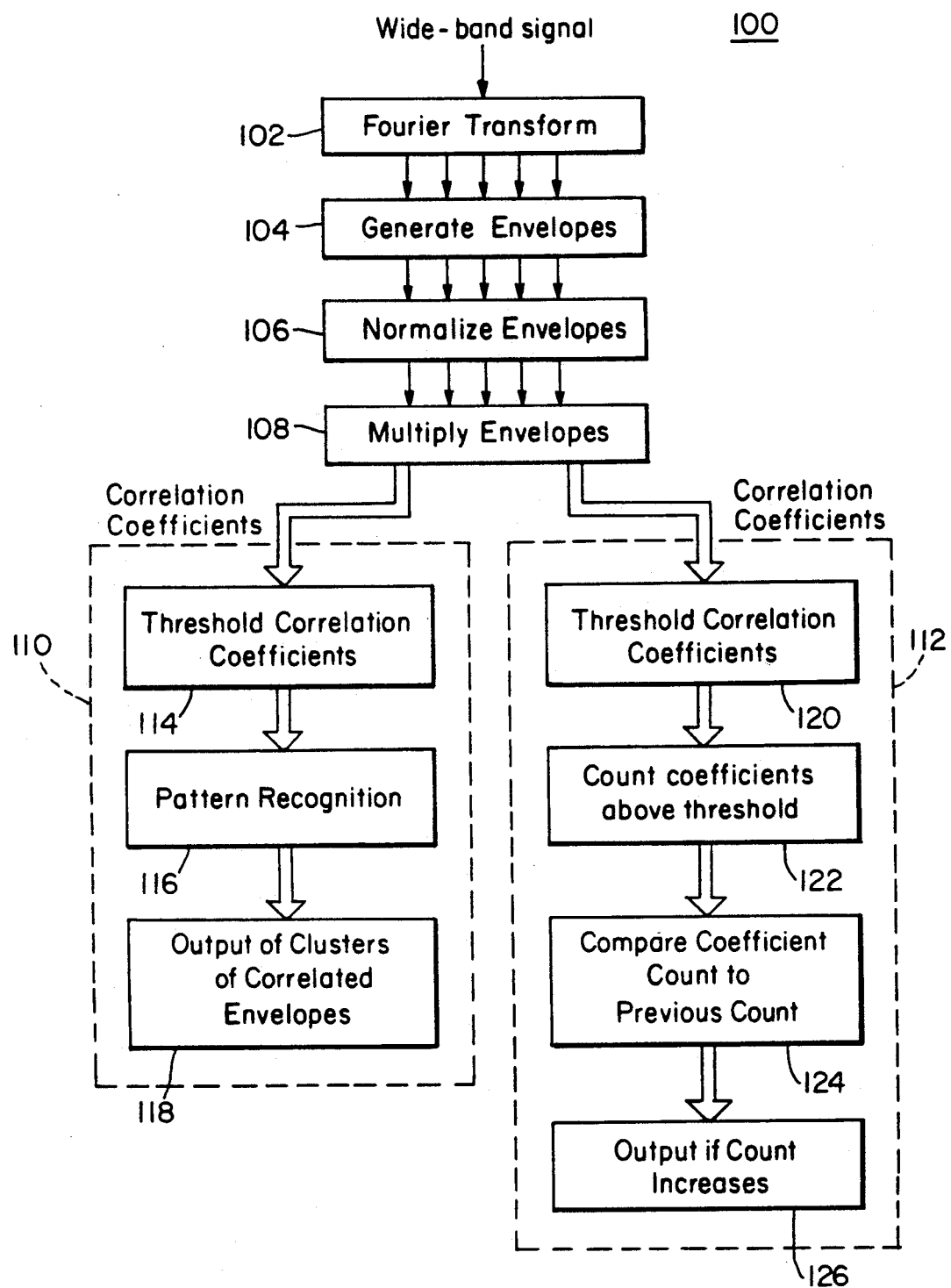
FIG. 4 is a block diagram of methods of detecting a subsurface ocean contact and the onset of an unusual brain event using the system of this invention.

The use of system 10a for detecting a sub-surface ocean contact and the onset of an unusual brain event is illustrated in FIG. 4. Detection method 100 includes first step 102 in which the wide-band input signal, in this case either a sound signal from an undersea receiver or a brain wave signal from an electroencephalograph, is Fourier transformed. Preferably, the wide-band signal is sampled over a time T divided into N time segments of equal length, and each segment is decomposed into M discrete wavelength bands. One discrete Fourier transform is performed on each segment to create $N \times M$ complex coefficients.

At step 104 the envelope of each narrow band component is determined by taking the square root of the sum of the squares of the real and imaginary components of each Fourier coefficient. The result is a matrix of $N \times M$ real coefficients arranged as N rows and M columns. Each envelope is normalized, step 106, by calculating the mean of each column and subtracting the mean from the envelope, calculating the sample variance of each column, taking the square root of the variance, and dividing the difference between the envelope and the column mean by the square root. The system in step 108 then calculates the correlation coefficients of all possible pairs of matrix columns or envelopes by multiplying the pairs of normalized envelopes, resulting in $M \times (M-1)/2$ independent correlation coefficients.

For detection of undersea contacts, branch 110 of method 100 is followed. At step 114, the system compares the correlation coefficients to a previously established threshold value, the choice of which would be apparent to one skilled in the art dependent on the specific situation. At step 116, the system looks for patterns in the correlation coefficients above the threshold, as is discussed below in connection with FIG. 5. The patterns show the existence of clusters of envelopes, all of which are correlated with each other and which thus indicate the existence of a single source of all the narrow band components that make up each cluster. At step 118, the system has an output for each group or cluster of correlated envelopes.

Figure 5:
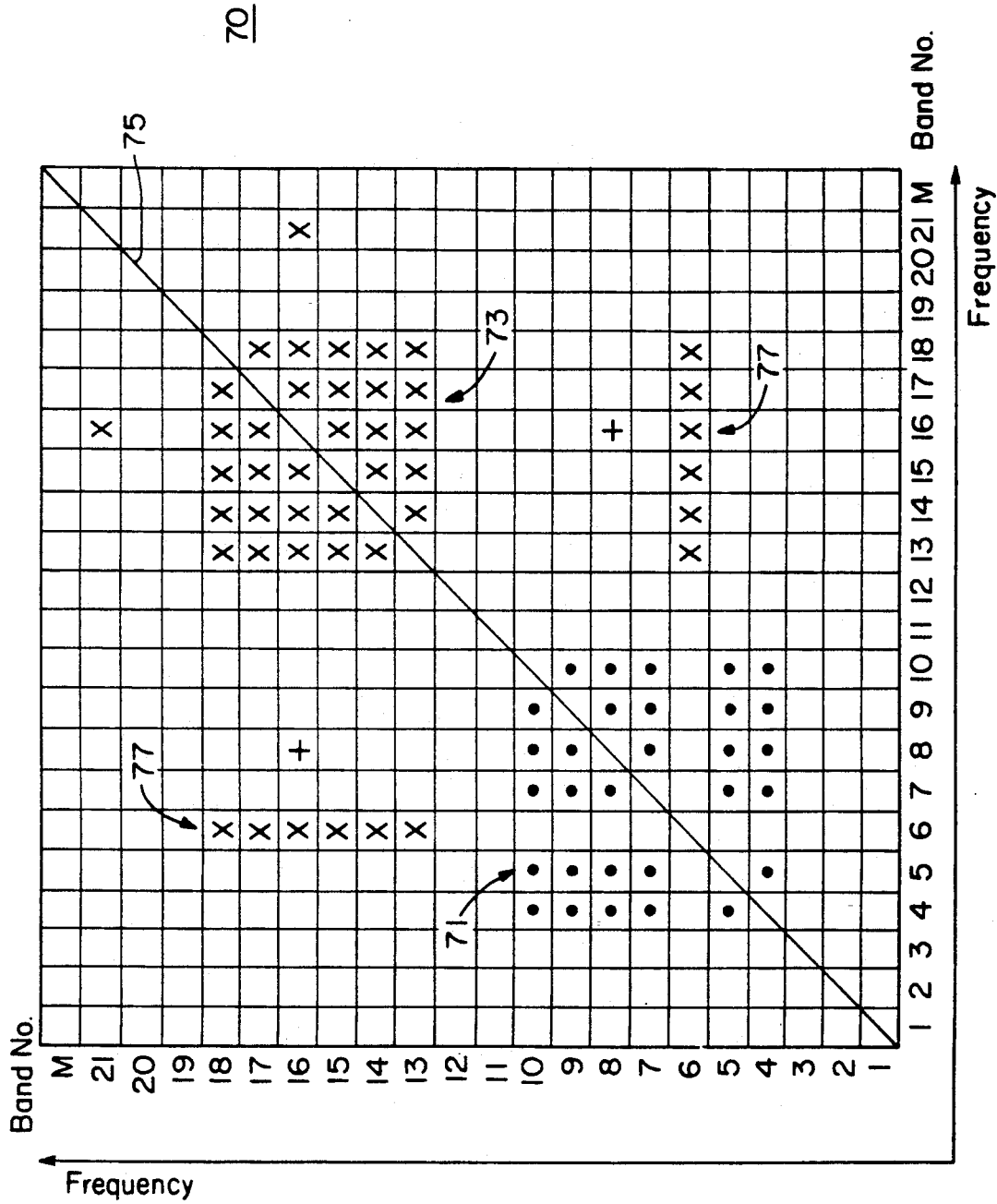
FIG. 5 is an example of a cross-correlation matrix partially illustrating the patterns of correlation coefficients resolved by the system of this invention for detecting a signal source.

A simplified example of an M by M matrix which illustrates the principle of this coefficient pattern recognition is shown in FIG. 5. The example is simplified by reducing the range of possible correlation coefficients (which in actuality is from $-1$ to $+1$) to just two: either below some threshold or above it. The sufficiently correlated envelope pairs are here marked with an X or a dot, as described below. The system first identifies clusters of highly correlated envelopes—complete or incomplete square areas within the M by M correlation coefficient matrix. Two separate clusters, area 71 from band 4 to band 10, and area 73 from band 13 to band 18, are here identified; the correlation coefficients identified with area 71 are designated with a dot in the chart; those associated with area 73 are designated with an x. Since the two sides of the matrix separated by diagonal 75 are mirror-images, any correlation of the envelopes of three or more adjacent wavelength bands will create a square shape. Such square shapes need not be continuous, as one or more linear areas may be in essence missing, as shown by linear area 77 at band 6 missing from square area 71.

The pattern recognition system then recognizes linear areas of high correlation and associates those linear areas with a previously identified square area. For example, single linear area 77, denoting correlation of band 6 with bands 13 through 18, may be unambiguously associated with area 73 because band 6 is not associated with area 71, but bands 13 through 18 are associated with area 73. Finally, the system identifies single correlations which can be unambiguously associated with a previously identified square area. For example, the system associates the single correlation of the envelopes of bands 16 and 21 with area 73. The band at frequency 21 is thus associated with bands 13 through 18. The correlation of the envelopes of bands 8 and 16 may not be unambiguously associated with either previously identified contact area 71 or 73. Accordingly, the correlation of bands 8 and 16 is ignored. It is a major purpose of the correlation analysis to minimize the effect of such ambiguities.

Figure 6:
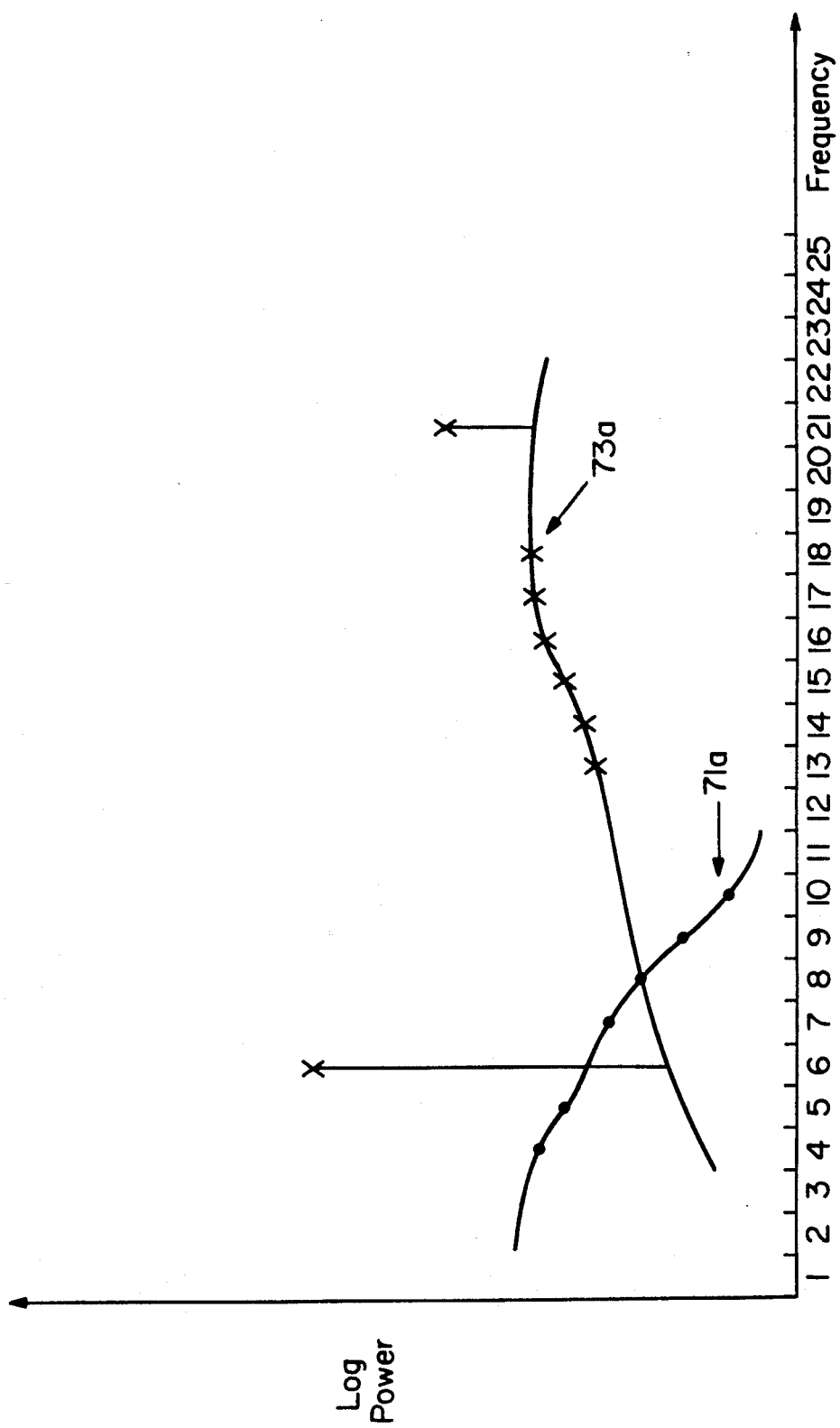
FIG. 6 is an example of an output of the system of this invention for the two separate undersea contacts detected as illustrated in FIG. 5.

An example of an output from step 118, FIG. 4, for the example of the cross correlation matrix of FIG. 5, is shown in FIG. 6. Graph 73a is a plot of frequency versus the log of the detected signal power for contact 73 represented by the X's in FIG. 5. The system indicates the detection of a single contact emitting within: narrow frequency bands 13 through 18, representing square area 73; narrow frequency band 6 representing linear area 77; and narrow frequency band 21, representing the single correlation of bands 16 and 21. Similarly, graph 71a is the output for the second contact 71, represented by the dots in FIG. 5, from which emission is detected in the narrow frequency bands 4, 5, and 7 through 10.

Figure 7A:
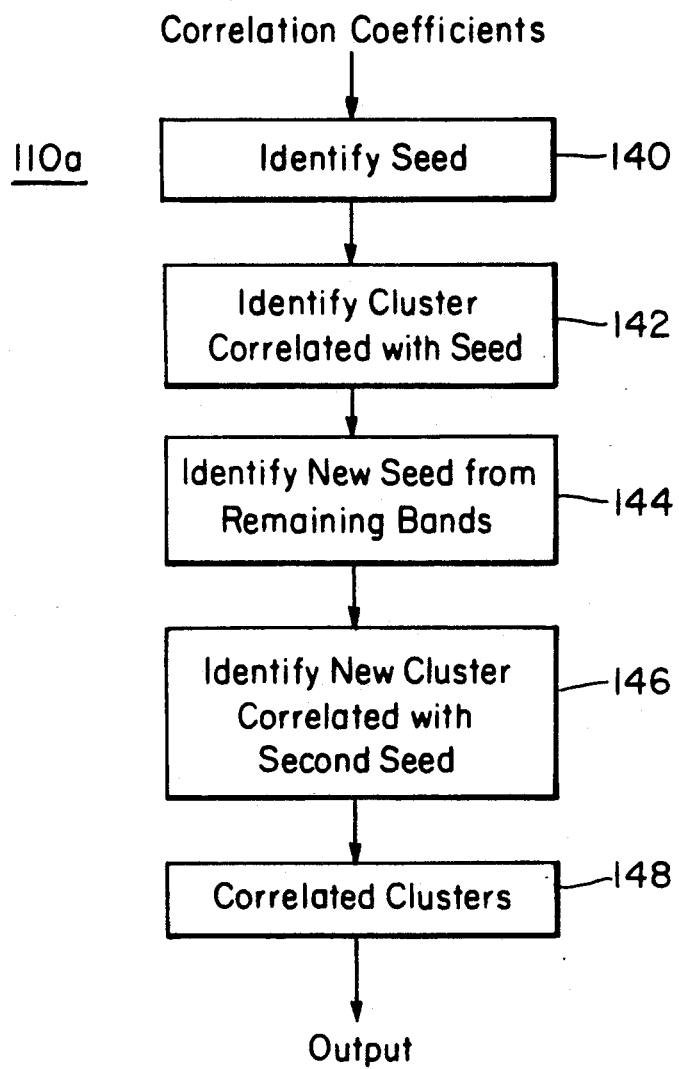
FIG. 7A is a block diagram of an alternative method of detecting a sub-surface ocean contact.

An alternative to branch 110, FIG. 4, for identifying one or more sources of sound in an undersea sound contact is shown in FIG. 7A. Branch 110a first identifies a seed frequency band or bands from the correlation coefficients, step 140, and identifies a cluster or clusters correlated with that seed, step 142. A cluster is a plurality of frequency bands which are sufficiently correlated to find that is likely that they have emanated from a single sound source. At step 144 the system identifies a new or second seed from the remaining frequency bands, and a new cluster correlated with that second seed is found, step 146. These two steps may be repeated to find additional seeds and clusters. At step 148 the clusters are correlated if desired to determine frequency bands that are associated with a single source.

Figure 7B:
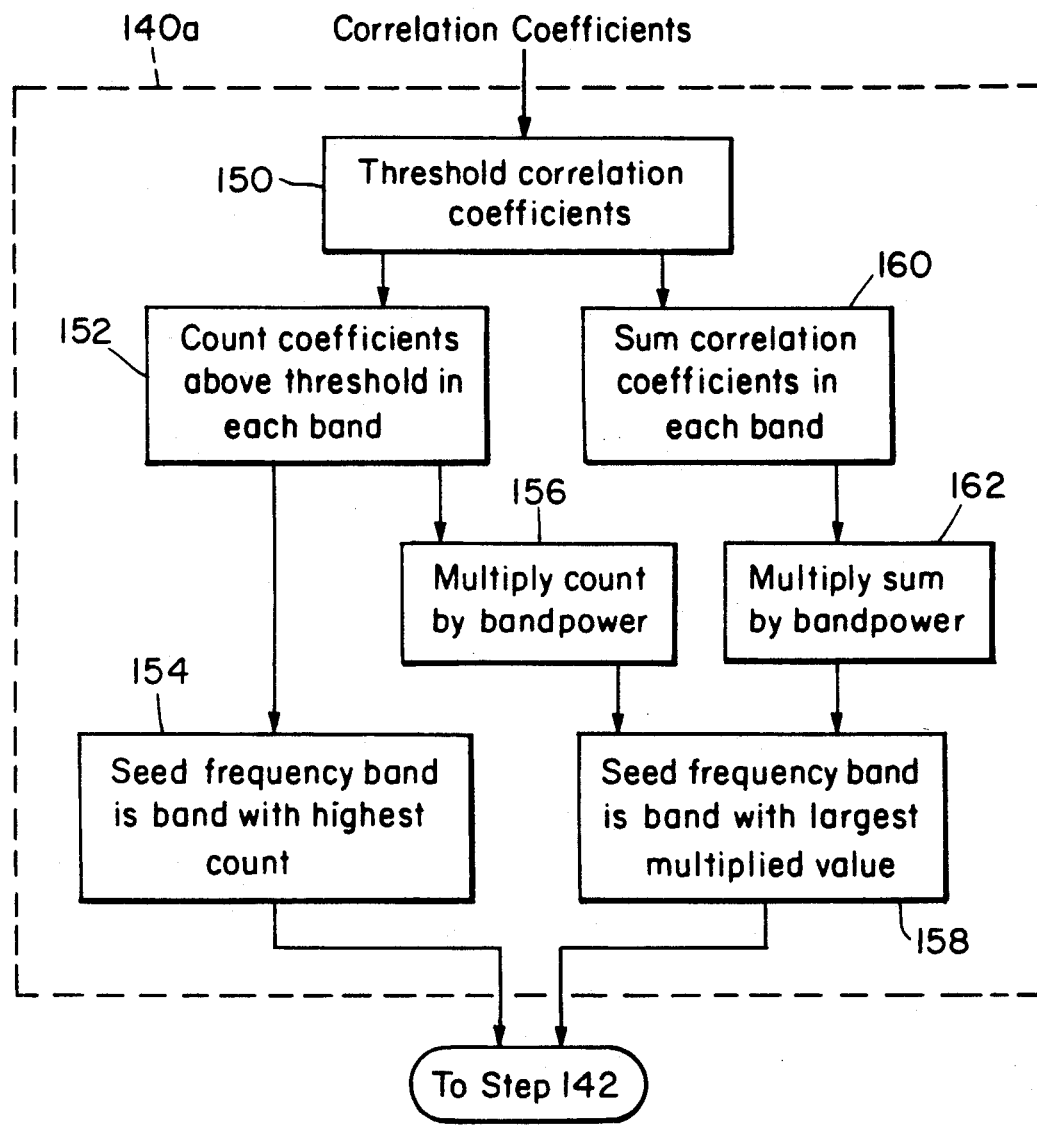
FIGS. 7B through 7D are block diagrams of several alternative methods of identifying seeds.
Figure 7D:
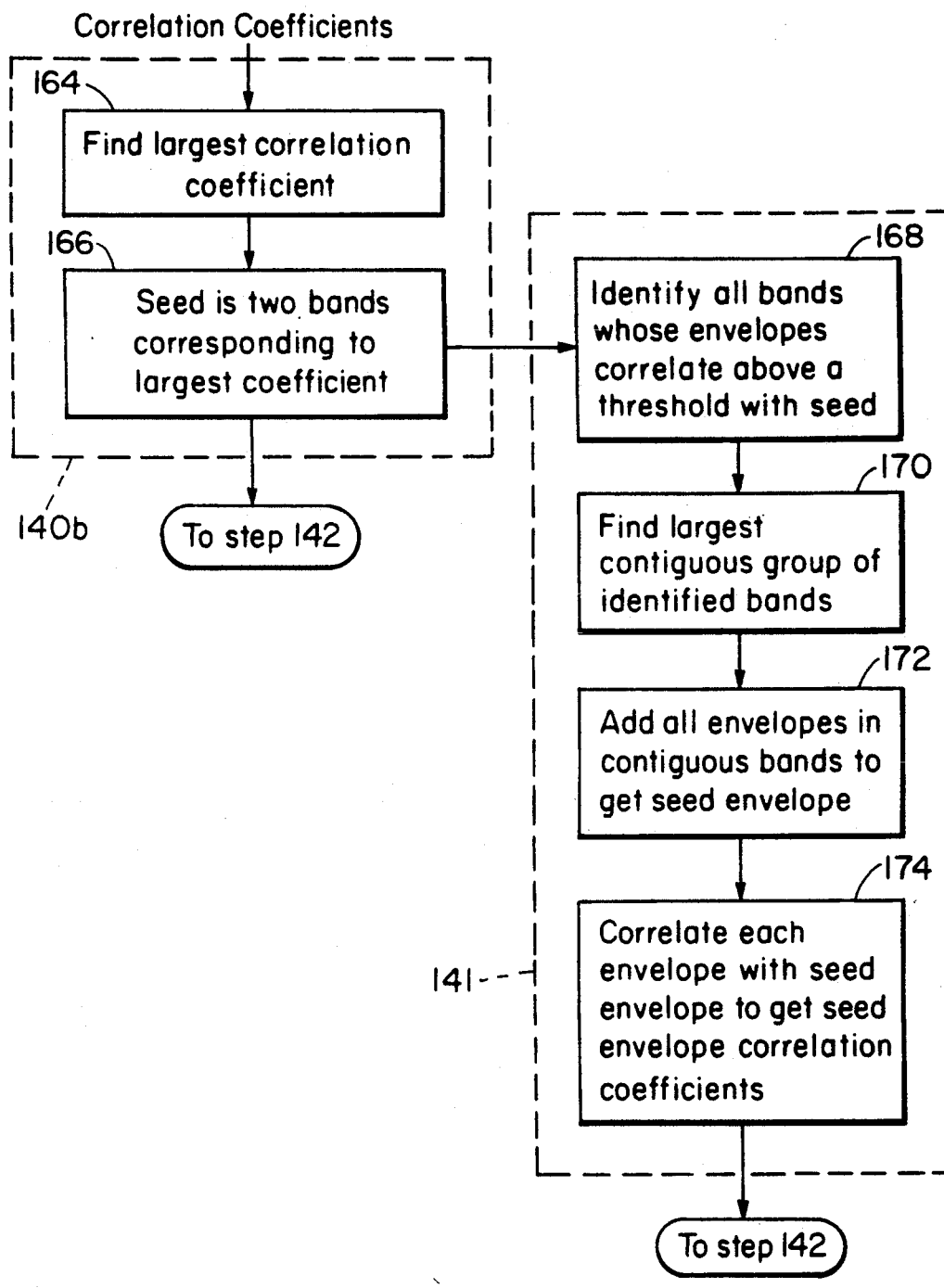
Figure 7C:
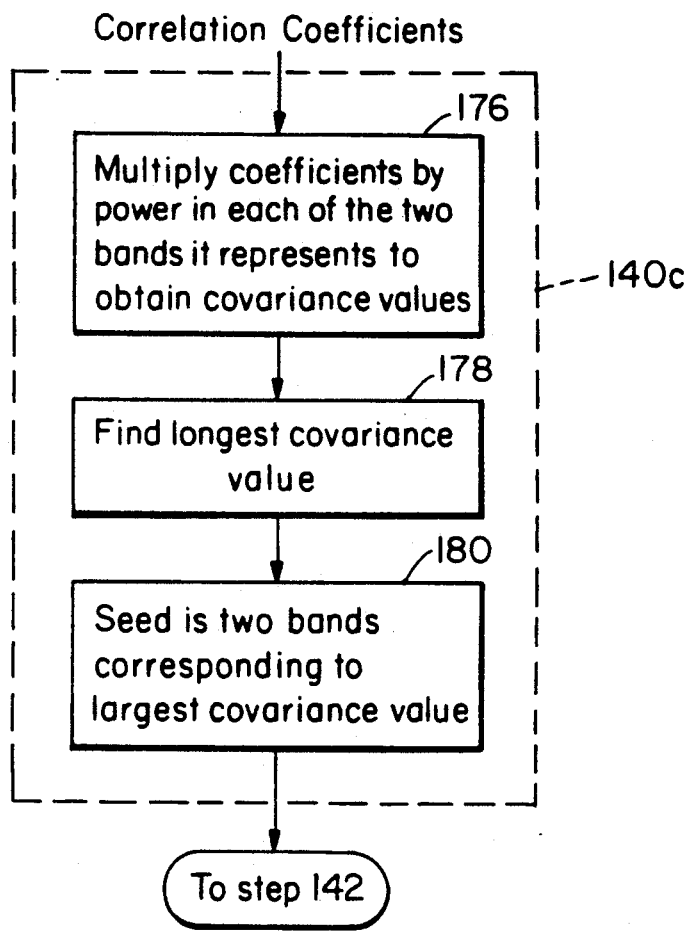

There are a number of methods for identifying a seed band or bands which are illustrated in FIGS. 7B through 7D. The seed identification step 140a, FIG. 7B, starts by thresholding the correlation coefficients to identify coefficients above a chosen threshold value. In one method, the coefficients above the threshold in each frequency band are counted, step 152, and the seed frequency band is found as that band with the highest number of coefficients above the threshold, step 154. Alternatively, the count of coefficients above the threshold in each band may be multiplied by the band power, step 156, and the seed frequency band found as that band with the largest multiplied count value. In yet another embodiment, instead of counting the coefficients above the threshold value, the system sums the coefficients in each band, step 160. This correlation coefficient sum is then multiplied by the band power, step 162, and the seed frequency band is found as the band with the largest multiplied value.

FIG. 7C depicts alternative branch 140c which identifies seed bands by first multiplying each correlation coefficient by the power in each of the two bands it represents to obtain a plurality of covariance values, step 176. The largest covariance value is found, step 178, and the seed is identified as the two bands corresponding to the largest value.

In another embodiment, FIG. 7D, branch 140b includes the steps of finding the largest correlation coefficient, step 164, and identifying the seed as the two bands corresponding to that coefficient, step 166. To determine a broad band seed, the system may include step 141, which identifies all bands whose envelopes correlate above a threshold with the seed, step 168, and then finds the largest contiguous group of the identified bands, step 170. In the example of FIG. 5, if the seed is bands 4 and 5, the largest contiguous count of thresholded coefficients are associated with bands 7 through 10, since band 6 is missing from sufficiently correlated coefficients 4, 5 and 7 through 10, in the combination of bands 4 and 5. Then, in step 172, FIG. 7D, the envelopes in contiguous bands 7 through 10 would be added together to create a new seed envelope. This seed envelope is then correlated with all of the envelopes, step 174, to get seed/envelope correlation coefficients which are then used to determine a cluster.

The patterns in the correlated envelope pairs indicative of undersea contacts are believed to be due to the fact that sound sources typically emit in a number of narrow frequency bands that may be adjacent or not. As the sound waves propagate through the water, they are attenuated similarly, causing the energy envelopes of the detected narrow band frequency signals emanating from a contact to have similar shapes, which results in a high degree of correlation between the envelope pairs of these narrow frequency bands. This phenomenon would account for the areas of highly correlated envelope pairs such as areas 71, 73, and 77, FIG. 5.

It is also known that the emission spectrums of separate undersea contacts often will overlap. However, the system of this invention is able to unambiguously associate sounds at discrete narrow wavelength bands with a single contact, regardless of such overlap, because the system looks for correlations between envelopes of each band and every other band; high correlation between envelopes indicates that the signals in those bands are all from a single contact.

Although the preferred embodiment has been described for detection of undersea contacts, this example is not meant to limit the invention; the signal processing system of this invention supplies information heretofore not available in the art of passive wide-band signal reception and analysis. The system can be used in any situation in which it is desired to extract information from a previously undescribed wide-band signal from a source not under the control of the receiver, for example in the analysis of electrocardiogram signals.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A frequency division, energy comparison signal processing system for detecting the presence of, and separating the contributions from, sources that compose a wide-band sound signal, comprising:
    means for dividing at least part of a wide-band sound signal into a plurality of discrete narrow frequency band components;
    means for generating the energy envelope of each of the narrow band components;
    means for normalizing each said envelope;
    means for multiplying each normalized envelope with each of the other normalized envelopes to obtain a plurality of envelope correlation coefficients for each frequency band component; and
    means for identifying a sound source seed frequency band for determining sound signal frequency components associated with a sound source.

2. The system of claim 1 in which said means for identifying includes means for comparing the envelope correlation coefficients to a correlation coefficient threshold value to identify coefficients above the threshold value.

3. The system of claim 2 in which said mean for identifying further includes means for counting the number of identified correlation coefficients in each frequency band.

4. The system of claim 3 in which said means for identifying further includes means for resolving the frequency band having the largest number of identified correlation coefficients.

5. The system of claim 3 further including means for resolving the signal power in each frequency band.

6. The system of claim 5 which said means for identifying further includes means for multiplying the identified correlation coefficient count in each frequency band by the frequency band power to obtain a frequency band weighted power value.

7. The system of claim 6 in which said means for identifying further includes means for resolving the frequency band having the largest weighted power value.

8. The system of claim 1 in which said means for identifying includes means for summing the correlation coefficients in each frequency band.

9. The system of claim 8 in which said means for identifying further includes means for resolving the frequency band having the largest correlation coefficient sum.

10. The system of claim 8 further including means for resolving the signal power in each frequency band.

11. The system of claim 10 in which said means for identifying further includes means for multiplying the correlation coefficient sum in each frequency band by the band power to obtain a frequency band summed weighted power value.

12. The system of claim 11 in which said means for identifying further includes means for resolving the frequency band having the largest summed weighted power value.

13. The system of claim 1 in which said means for identifying includes means for determining the largest correlation coefficient.

14. The system of claim 13 in which said means for identifying includes means for resolving the two frequency bands corresponding to the largest correlation coefficient.

15. The system of claim 1 further including means for resolving the signal power in each frequency band.

16. The system of claim 15 in which said means for identifying includes means for multiplying each correlation coefficient by the signal power in both frequency bands corresponding to the correlation coefficient to obtain frequency band covariance values.

17. The system of claim 16 in which said means for identifying further includes means for determining the largest covariance value.

18. The system of claim 17 in which said means for identifying further includes means for resolving the two frequency bands corresponding to the largest covariance value.

19. The system of claim 14 in which said means for identifying further includes means for identifying the bands with envelopes that correlate above a threshold with the two resolved frequency bands.

20. The system of claim 19 in which said means for identifying further includes means for resolving the largest contiguous group of identified frequency bands.

21. The system of claim 20 in which said means for identifying further includes means for summing the energy envelopes of the resolved frequency bands to create a seed energy envelope.

22. The system of claim 21 further including means for correlating each energy envelope with the seed energy envelope to obtain a plurality of seed/envelope correlation coefficients.

23. The system of claim 22 further including means for analyzing the seed/envelope correlation coefficients to obtain a pattern of seed/envelope correlation coefficients indicative of the presence of one or more sound sources.

24. The system of claim 1 further including means for resolving a cluster of envelopes with high correlation within said seed frequency band.

25. The system of claim 24 in which said means for resolving includes means for comparing the envelope correlation coefficients in said seed frequency band to a correlation coefficient threshold value to identify coefficients above the threshold value.

26. The system of claim 25 in which the identified cluster includes frequency bands corresponding to the coefficients above the threshold value.

* * * * *